US012621165B2

(12) United States Patent
Sanders

(10) Patent No.: US 12,621,165 B2
(45) Date of Patent: May 5, 2026

(54) METHODS AND DEVICES FOR AUTHENTICATION AND VERIFICATION OF NON-REVOCATION

(71) Applicant: ORANGE, Issy-les-moulineaux (FR)

(72) Inventor: Olivier Sanders, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 105 days.

(21) Appl. No.: 18/692,104

(22) PCT Filed: Sep. 9, 2022

(86) PCT No.: PCT/FR2022/051705
§ 371 (c)(1),
(2) Date: Mar. 14, 2024

(87) PCT Pub. No.: WO2023/041863
PCT Pub. Date: Mar. 23, 2023

(65) Prior Publication Data
US 2024/0396739 A1     Nov. 28, 2024

(30) Foreign Application Priority Data

Sep. 15, 2021     (FR) ...................................... 2109677

(51) Int. Cl.
*H04L 9/32* (2006.01)
*H04L 9/30* (2006.01)
(52) U.S. Cl.
CPC .......... *H04L 9/3247* (2013.01); *H04L 9/3218* (2013.01); *H04L 9/3073* (2013.01); *H04L 9/3255* (2013.01)

(58) Field of Classification Search
CPC ... H04L 9/3247; H04L 9/3218; H04L 9/3073; H04L 9/3255
See application file for complete search history.

(56) References Cited

PUBLICATIONS

Henry et al., Thinking Inside the BLAC Box, 2013 ACM, pp. 71-82 (Year: 2013).*
Sanders et al., EPID with Malicious Revocation, 2020, Computer Vision—ECCV pp. 177-200 (Year: 2020).*
(Continued)

*Primary Examiner* — Ellen Tran
(74) *Attorney, Agent, or Firm* — David D. Brush; Westman, Champlin & Koehler, P.A.

(57) ABSTRACT

Method and device for authentication of non-revocation. A revocation list includes at least one pair extracted from a signature generated by a revoked entity, where $h_i$ is an element of a mathematical group and $k_i = h_i^{xi}$, where xi is a secret of the revoked entity. A first entity sends, to a second entity, to authenticate itself therewith: a signature generated by the first entity for this authentication; a character string; an element of the group for each pair in the revocation list; and a zero-knowledge proof that the first entity used a secret of this first entity and the character string to obtain the group element for each pair. The second entity rejects the first entity if the zero-knowledge proof is not valid or if, for at least one the pair, the group element is such that $C_i = h_i^A$, where A is a known value.

9 Claims, 3 Drawing Sheets

(56) References Cited

PUBLICATIONS

English translation of the Written Opinion of the International Searching Authority dated Jan. 3, 2023 for corresponding International Application No. PCT/FR2022/051705, filed Sep. 9, 2022.

Brickell E. et al., "Enhanced Privacy ID: A Direct Anonymous Attestation Scheme with Enhanced Revocation Capabilities," Aug. 17, 2007.

Camenisch J. et al., "Practical Verifiable Encryption and Decryption of Discrete Logarithms," Crypto 2003, LNCS 2729, pp. 126-144, 2003, International Association for Cryptologic Research 2003.

Schnorr C. P., "Efficient Identification and Signatures for Smart Cards," Advances in Cryptology—Crypto '89, LNCS 435, pp. 239-252, 1990.

Bowe S., "BLS12-381: New zk-Snark Elliptic Curve Construction," Electric Coin Co. Website Blog Post, https://electriccoin.co/blog/new-snark-curve/ Mar. 11, 2017.

International Search Report dated Jan. 3, 2023 for corresponding International Application No. PCT/FR2022/051705, filed Sep. 9, 2022.

Written Opinion of the International Searching Authority dated Jan. 3, 2023 for corresponding International Application No. PCT/FR2022/051705, filed Sep. 9, 2022.

* cited by examiner

METHODS AND DEVICES FOR AUTHENTICATION AND VERIFICATION OF NON-REVOCATION

CROSS-REFERENCE TO RELATED APPLICATIONS

This Application is a Section 371 National Stage Application of International Application No. PCT/FR2022/051705, filed Sep. 9, 2022, which is incorporated by reference in its entirety and published as WO 2023/041863 A1 on Mar. 23, 2023, not in English.

BACKGROUND OF THE INVENTION

The invention relates to the general field of digital data protection and cryptography.

It lies more particularly in the context of authentication mechanisms.

These authentication mechanisms are nowadays extremely widespread, in particular those based on digital signatures or certificates.

The use of digital signatures poses a certain number of problems, in particular in that it makes it possible to trace the signatory and in that it potentially discloses too much information about the signatory.

Indeed, when a digital signature relates to a set of certified data, the set of certified data has to be disclosed in order to be able to verify the authenticity thereof.

This has led to the development of authentication techniques that aim to disclose as few elements as possible at the time of an authentication. These techniques are widely deployed and known as anonymous digital signatures.

However, these anonymous authentication systems pose difficulties in terms of revoking the rights of an entity.

To address this problem, an authentication mechanism known as EPID (Enhanced Privacy ID) has been defined (see for example the publication "Enhanced privacy id: a direct anonymous attestation scheme with enhanced revocation capabilities" by Brickell and Li, published at the WPS2007 conference). In this mechanism:

an entity is said to be revoked when one of its signature keys is revoked, this being done by placing one of the signatures generated with this key on a revocation list;

any entity that produces a signature must provide proof that this signature was not produced with the revoked key, that is to say with the key of a signature recorded in the revocation list, thus proving that the entity authenticating itself is not the one that has been revoked.

The invention lies more specifically in the context in which the signatures comprise a pair $(h, h^x)$, where h is an element of a mathematical group and x is the secret of the signing entity, and in which this pair is written to the revocation list. This pair is denoted $(h_i, k_i=h_i^{xi})$ hereinafter.

The most effective technique known to date to report proof that a secret x used to produce a signature differs from a secret xi used to produce a signature $(h_i, k_i=h_i^{xi})$ in the revocation list requires sending three elements of the mathematical group to the entity verifying the proof, this is to say around 894 bits.

In practice, revocation lists may contain a very large number N of pairs $(h_i, k_i=h_i^{xi})$, typically several tens of thousands.

Having to communicate 3.N group elements (or 894.N bits) to prove that a signing entity is not revoked may constitute a significant drawback when N increases.

The invention targets in particular an authentication method that does not exhibit this drawback.

Aim and Summary of the Invention

According to a first aspect, the invention relates to an authentication method implemented by an authentication device of a first entity in order to authenticate this first entity with a second entity. This method comprises:

a step of generating a signature in order to authenticate the first entity with the second entity, said signature comprising a pair $(h, h^{X100})$, where X100 is a secret specific to the first entity and h is an element of a mathematical group;

for each index i of a pair $(h_i, k_i)$ contained in a revocation list (LR), said pair $(h_i, k_i)$ having been extracted from a signature generated by a revoked entity, $h_i$ being an element of said group, with $k_i=h_i^{xi}$, xi being a secret specific to said revoked entity:

(i) a step of obtaining, deterministically, a value $a_i$ from said index i and from a character string specific to said authentication;

(ii) a step of obtaining an element of the mathematical group using the formula $C_i=(h_i^{\alpha_i}\cdot k_i)^{A/\alpha i+X100}$ where:

$h_i$ and $k_i$ are the elements of the pair of index i in the revocation list;

A is a known value;

$a_i$ is said deterministically obtained value; and

X100 is the secret of the first entity;

a step of generating a zero-knowledge proof that said authentication device used the secret X100 and said character string to obtain said group element $C_i$ for each of the pairs in the revocation list; and a step of sending, to the second entity:

said signature;

said character string;

said zero-knowledge proof; and said element $C_i$ for each pair $(h_i, k_i)$ in the revocation list.

In correlation, the invention relates to an authentication device of a first entity, said device being configured to authenticate this first entity with a second entity, this device comprising:

a module for generating a signature in order to authenticate the first entity with the second entity, said signature comprising a pair $(h, h^{X100})$, where X100 is a secret specific to the first entity and h is an element of a mathematical group;

a cryptographic module configured, for each index i of a pair $(h_i, k_i)$ contained in a revocation list, said pair $(h_i, k_i)$ having been extracted from a signature generated by a revoked entity, $h_i$ being an element of said group, with $k_i=h_i^{xi}$, xi being a secret specific to an entity that generated said signature, to:

(i) deterministically obtain a value $a_i$ from said index i and from said character string;

(ii) obtain an element $C_i$ of said mathematical group (G1) using the formula $C_i=(h_i^{\alpha_i}\cdot k_i)^{A/\alpha i+X100}$ where:

$h_i$ and $k_i$ are the elements of the pair of index i in the revocation list;

A is a known value;

$a_i$ is said deterministically obtained value; and

X100 is the secret of the entity 100;

a module for generating a zero-knowledge proof that said authentication device used the secret and the character string to obtain the group element $C_i$ for each of the pairs in said revocation list; and a module for sending, to the second entity:
  said signature;
  said character string;
  said zero-knowledge proof; and
  said element $C_i$ for each pair $(h_i, k_i)$ in the revocation list.

According to a second aspect, the invention relates to a non-revocation verification method implemented by a non-revocation verification device of a second entity during the authentication of a first entity, said method comprising:
  a step of receiving:
    a signature generated by the first entity for this authentication;
    a character string;
    an element $C_i$ of one and the same mathematical group for each pair $(h_i, k_i)$ contained in a revocation list, said pair $(h_i, k_i)$ having been extracted from a signature generated by a revoked entity, $h_i$ being an element of said group, with $k_i = h_i^{xi}$, xi being a secret specific to said revoked entity; and
    a zero-knowledge proof that said first entity used a secret of this first entity and said character string to obtain said group element for each of the pairs in the revocation list; and
  a step of rejecting said first entity on the grounds of revocation if said zero-knowledge proof is not valid or if, for at least one said pair $(h_i, k_i)$, the group element $C_i$ is such that $C_i = h_i^A$, where A is a known value.

In correlation, the invention relates to a non-revocation verification device, this device being configured to verify, during the authentication of a first entity with a second entity, whether this first entity should be rejected on the grounds of revocation, this device comprising:
  a module for receiving:
    a signature generated by the first entity for this authentication;
    a character string;
    an element $C_i$ of one and the same mathematical group for each pair $(h_i, k_i)$ in a revocation list, said pair $(h_i, k_i)$ having been extracted from a signature generated by a revoked entity, $h_i$ being an element of said group, with $k_i = h_i^{xi}$, xi being a secret specific to said revoked entity; and
    a zero-knowledge proof that said first entity used a secret of this first entity and said character string to obtain said group element $C_i$ for each of the pairs in said revocation list; and
  a module for rejecting said first entity on the grounds of revocation if said zero-knowledge proof is not valid or if, for at least one said pair $(h_i, k_i)$, the group element $C_i$ is such that $C_i = h_i^A$, where A is a known value.

Generally speaking, the invention lies in the context of the authentication of a first entity with a second entity, no limit being attached to the nature of the first and second entities.
  For example:
  the first entity is a processor and the second entity is a server of the manufacturer of this processor;
  the first entity is a client device and the second entity is a server device;
  the first entity is a microcircuit card and the second entity is a reader for reading such a card;
  etc.

As mentioned in the introduction, the invention proposes a mechanism in which a first entity seeking to authenticate itself with a second entity produces, for this new authentication, a signature with a secret that is specific thereto, and provides proof to this second entity that this secret is different from all of the secrets used to produce signatures from which pairs recorded in the revocation list have been extracted.

In one particular embodiment, the revocation list is created and updated by the second entity. For example, when the second entity considers that an entity that has authenticated itself therewith with a signature is exhibiting suspicious behavior, it records the pair $(h_i, k_i)$ of this signature in the revocation list. However, this embodiment is not limiting, and the revocation list may be created or maintained by a third party, or even by a plurality of third parties.

What is noteworthy is that, if N is used to denote the number of pairs in the revocation list, it is noted that the proof of non-revocation as such comprises:
  firstly, a character string and a zero-knowledge proof, regardless of the number of pairs in the revocation list; and
  secondly, a single element of the mathematical group, Ci, per pair in the revocation list.

This result is of particular interest because, as mentioned above, in the best known techniques, the proof of non-revocation comprises three elements of the mathematical group per pair in the revocation list.

The single group element Ci that is sent in the proposed technique has a maximum size of 380 bits whereas, in the known prior art, the three cyclic elements together have a size of 894 bits. For more information, those skilled in the art may refer to the documents https://electriccoin.co/blog/new-snark-curve/and https://link.springer.com/chapter/10.1007%2F978-3-540-45146-4_8, Section 5.

The improvement provided by the invention is very significant, especially when the number of revoked signatures increases.

In one particular embodiment of the invention, the zero-knowledge proof is produced using the Schnorr protocol described in the publication "Efficient Identification and Signatures for Smart Cards" by Claus-Peter Schnorr, CRYPTO 1989.

When the Schnorr protocol is used, the zero-knowledge proof contains only 2 scalars (integer modulo p), each of 256 bits. It therefore has a size of 512 bits regardless of the number N of pairs in the revocation list.

Moreover, the computing of $C_i$ is particularly advantageous. Indeed, according to the invention $$C_i = \left( h_i^{a_i} \cdot k_i \right)^{A/a_i + X100} \tag{1}$$

where:
  $h_i$ and $k_i$ are the elements of the pair of index i in the revocation list;
  A is a known value, for example 1;
  $a_i$ is the deterministically obtained value; and
  X100 is the secret of the first entity.

By virtue of this formula, the verification of non-revocation is extremely simple.

Indeed, if the first entity has already been revoked, the revocation list comprises a pair $(h_i, k_i)$ with $k_i = h_i^{X100}$.

And in this case, $C_i = h_i^A$ (for example $C_i = h_i$ if A=1).

The non-revocation verification device is therefore able to detect very easily, on the basis of the single received group element $C_i$, that the first entity should be rejected for this new authentication. It is sufficient for it, after having verified the validity of the zero-knowledge proof to ensure that the elements $C_i$ have been formed correctly, to compare the received value $C_i$ with $h_i^A$.

On the contrary, if the secret X100 of the first entity has not been used in any of the signatures whose pairs are stored in the revocation list, then the element $C_i$ appears to the non-revocation verification device to be a pseudo-random value.

This feature is of great interest from the point of view of preserving anonymity, since the element $C_i$ does not disclose any information about the secret X100.

The abovementioned character string may be arbitrary. The only constraint is that it is specific to this new authentication, in other words that it is different from other character strings used to constitute proofs of non-revocation for previous authentications of the first entity.

In practice, the authentication device does not explicitly verify that the character string has not been used to prove non-revocation for a previous authentication of the entity. However, the mechanism for obtaining the character string is such that such a collision is statistically unlikely; the character string is for example a 256-bit random.

In one embodiment, the character string is at least part of the signature. This embodiment is particularly advantageous since it avoids having to send the character string as such, this being able to be deduced directly by the non-revocation verification device from the signature.

In one embodiment, the value $a_i$ is obtained by $a_i=H$ (STR$\|$i), where H is a public hash function.

In one embodiment, the mathematical group is a cyclic group of order p, p being a prime number. The invention is applicable in particular, but without limitation, when the signatures are produced for bilinear groups.

In one particular embodiment, the various steps of the authentication method and the various steps of the non-revocation verification method are determined by computer program instructions or are implemented by a silicon chip that comprises transistors suitable for forming logic gates of a hard-wired non-programmable logic unit.

The invention therefore also targets a computer program on an information medium, this program being able to be implemented in a device or more generally in a computer, this program comprising instructions designed to implement the steps of an authentication method or of a non-revocation verification method as described above.

This program may use any programming language and be in the form of source code, object code or intermediate code between source code and object code, such as in a partially compiled form, or in any other desirable form.

The invention also targets a computer-readable information medium comprising instructions of a computer program as mentioned above. The information medium may be any entity or device capable of storing the program. For example, the medium may comprise a storage means, such as a ROM, a non-volatile memory such as a flash memory or else a magnetic recording means, for example a hard disk. Moreover, the information medium may be a transmissible medium such as an electrical or optical signal, which may be routed via an electrical or optical cable, by radio or by other means. The program according to the invention may in particular be downloaded over the Internet. As an alternative, the information medium may be an integrated circuit into which the program is incorporated, the circuit being designed to execute or to be used in the execution of the method in question.

BRIEF DESCRIPTION OF DRAWINGS

Other features and advantages of the present invention will become apparent from the description given below with reference to the appended drawings, which illustrate exemplary embodiments thereof that are in no way limiting. In the figures.

DESCRIPTION OF THE EMBODIMENTS

Figure 1:
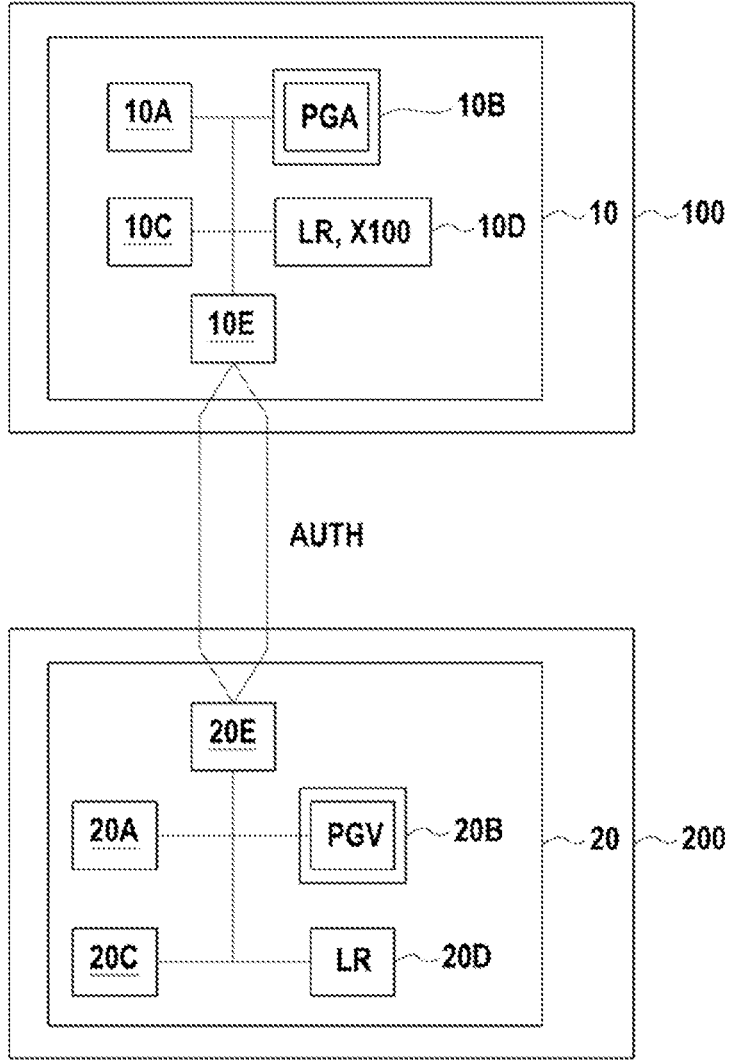
FIG. 1 shows an authentication device and a non-revocation verification device according to one particular embodiment of the invention.

FIG. 1 shows, in their environment, an authentication device 10 and a non-revocation verification device 20 according to one particular embodiment of the invention.

In the embodiment described here, the authentication device 10 is incorporated into a first entity 100. The entity 100 uses the device 10 to authenticate itself with a second entity 200.

In the embodiment described here, the non-revocation verification device 20 is incorporated into the second entity 200. The entity 200 uses the non-revocation verification device 20 to verify whether the first entity 100 should be rejected for this new authentication.

In the embodiment, when an entity carries out an authentication or authenticates itself with the second entity 200, it uses a signature comprising a pair (h, k), where:

h is an element of a mathematical group G1, for example a cyclic group of order p, p being a prime number; and $k=h^x$, where x is a secret of this entity.

In the embodiment described here, when the second entity 200 considers for example that this entity 100 is exhibiting suspicious behavior, it records the pair (h, k) in a revocation list LR. In another embodiment, the revocation list is administered by a third-party entity mandated to do so. There is no limit attached to the way in which this revocation list is established.

The revocation list LR therefore comprises a list of N pairs $(h_i, k_i)$, i=1 to N, the pair $(h_i, k_i)$ having been obtained by the second entity 200 from the $i^{th}$ signature accompanying a behavior considered to be suspicious by the entity 200. In this pair, $h_i$ belongs to the abovementioned group G1 and $k_i=h_i^{xi}$, xi being the secret of the entity that issued this signature.

In the embodiment described here, the authentication device 10 has a hardware architecture of a computer. It comprises in particular a processor 10A, a read-only memory 10B, a random access memory 10C, a rewritable non-volatile memory 10D and communication means 10E for communicating with the entity 200.

The read-only memory 10B of the device 10 constitutes a recording medium according to the invention, able to be read by the processor 10A and on which there is recorded a computer program PGA according to the invention, this program comprising instructions for executing the steps of an authentication method according to the invention that are described later with reference to FIG. 2 in one embodiment.

In the embodiment described here, the authentication device 10 uses these communication means 10 to obtain an up-to-date version of the revocation list LR from the second entity 200. It is emphasized here that the two entities 100 and 200 must agree beforehand on the version of the revocation list to be used in an authentication. In one particular embodiment, the second entity 200 sends the revocation list before authentication. In another particular embodiment, the first entity 100 obtains the version of the revocation list from a public source. There is no limit attached to the way in which this revocation list is obtained.

In the embodiment described here, the non-volatile memory 10D of the authentication device 10 comprises:

a secret X100 specific to the entity 100; and a copy of the revocation list LR.

In the embodiment described here, the non-revocation verification device 20 has a hardware architecture of a computer. It comprises in particular a processor 20A, a read-only memory 20B, a random access memory 20C, a rewritable non-volatile memory 20D and communication means 20E for communicating with the entity 100.

The read-only memory 20B of the device 10 constitutes a recording medium according to the invention, able to be read by the processor 20A and on which there is recorded a computer program PGV according to the invention, this program comprising instructions for executing the steps of a non-revocation verification method according to the invention that are described later with reference to FIG. 2 in one embodiment.

In the embodiment described here, the non-volatile memory 20D of the non-revocation verification device 20 comprises an up-to-date copy of the revocation list LR.

The communication means 10E and 20E are configured to enable the devices 10 and 20 to communicate with one another.

Figure 2:
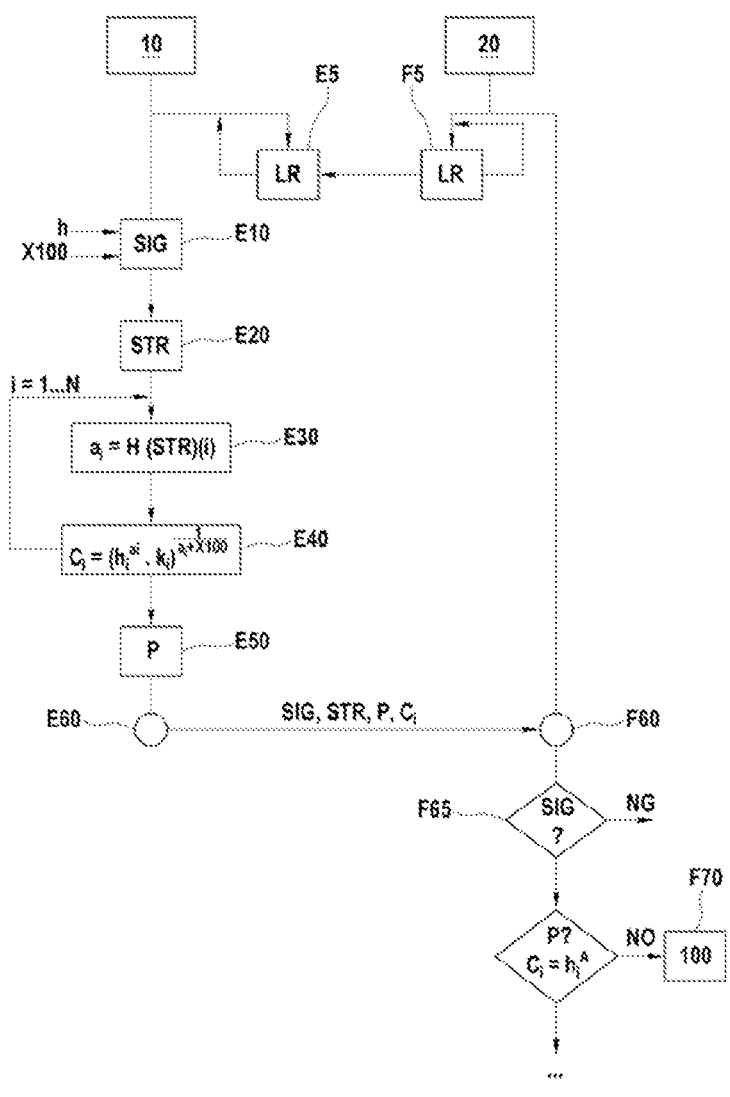
FIG. 2 shows, in the form of a flowchart, the main steps of an authentication method and the main steps of a non-revocation verification method according to one particular embodiment of the invention.

We will now describe, with reference to FIG. 2:

the main steps of an authentication method implemented by the authentication device 10 in order to authenticate the entity 100 with the second entity 200; and the main steps of a non-revocation verification method implemented by the non-revocation verification device 20 in order to verify whether the first entity 100 should be rejected on the grounds of revocation in this authentication.

In this embodiment, during a general step F5, the non-revocation verification device 20 creates and keeps up to date a revocation list in which it stores the pairs $(h_i, k_i)$ contained in the signatures produced by entities that authenticate themselves with the entity 200 when it considers that these entities are exhibiting suspicious behavior.

We will assume hereinafter that the up-to-date revocation list LR is obtained by the authentication device 10 during a step E5.

During a step E10, the authentication device 10 generates a signature SIG in order to authenticate the entity 100 with the entity 200.

In the embodiment described here, this signature SIG comprises a pair (h, $h^{X100}$), where X100 is the secret of the entity 100 and h is an element of the mathematical group G1.

In the embodiment described here, the method comprises steps E20 to E60 in order to prove to the entity 200 that the entity 100 is not revoked. More precisely, this proof of non-revocation aims to provide proof to the second entity 200 that the secret X100 used to generate the signature SIG is not a secret that was used to produce a signature comprising one of the N pairs $(h_i, k_i)$ in the revocation list LR.

During a step E20, the authentication device 10 obtains a character string STR specific to this new authentication. This character string has never been used to generate such a proof, that is to say it is different from those that it used for other proofs.

In the embodiment described here, the string STR is part of the signature SIG, for example that part of the signature SIG that does not comprise the pair (h, $h^{X100}$). This makes it possible to limit the number of elements transmitted by the authentication device in order to provide proof of non-revocation.

In the embodiment described here, the authentication method comprises a loop comprising two steps E30, E40 for each index i, i=1 to N, N being the number of pairs in the revocation list LR.

During a step E30, the authentication device 10 derives, deterministically, a value $a_i$ from the character string STR and from the index i.

The fact that this value $a_i$ is derived deterministically means that it is obtained without using a random. Any entity that knows the character string STR and the index i is thus capable of computing $a_i$.

In the embodiment described here, $a_i$=H(STR∥i), where H is a public hash function, for example SHA-256 or SHA-3.

During a step E40, the authentication device 10 computes or obtains an element $C_i$ of the mathematical group G1 using the formula:

$$C_i = \left(h_i^{a_i} \cdot k_i\right)^{A/a_i + X100} \tag{1}$$

where:

$h_i$ and $k_i$ are the elements of the pair of index i in the revocation list LR;

A is a known value, for example 1;

$a_i$ is the value obtained deterministically in step E30; and

X100 is the secret of the entity 100.

The known value A may be defined globally in the parameters of the system or locally, for example by one of the two entities involved in the authentication process.

In the embodiment described here, during a step E50, the authentication device 10 generates a zero-knowledge proof P that the device 10 used the secret X100 of the entity 100 to obtain the group element $C_i$ for each of the pairs $(h_i, k_i)$ in the revocation list LR, in other words that it knows x, such that, for any value of i:

$$C_i^x = \left(h_i^{a_i} \cdot k_i\right)^A \cdot C_i^{-a_i}$$

Such a proof is highly conventional in cryptography.

In the embodiment described here, it is produced using the Schnorr protocol: the zero-knowledge proof P contains only 2 scalars (integer modulo p), each of 256 bits, regardless of the number N of pairs in the revocation list LR.

In the embodiment described here, during a step E60, the authentication device 10 sends, to the second entity 200:

the signature SIG for this new authentication;

the character string STR specific to this new authentication;

the zero-knowledge proof P; and an element $C_i$ of the group G1 for each pair $(h_i, k_i)$ in the revocation list LR, i=1 to N.

In this particular embodiment, the second entity 200 therefore receives, during a step F60:

the signature SIG for this new authentication;

the character string STR specific to this new authentication;

the zero-knowledge proof P; and an element of the group $C_i$ for each pair $(h_i, k_i)$ in the revocation list LR, i=1 to N.

In the embodiment described here, the second entity 200 verifies whether the signature SIG is valid during a step F65. If this is not the case, it rejects the authentication.

In the embodiment described here, the non-revocation verification device 20 rejects the first entity 100 on the grounds of revocation during a step F70 if the zero-knowledge proof P is not valid or if, for at least one said pair $(h_i, k_i)$, the group element $C_i$ is such that $C_i=h_i^A$. It then records the pair $(h, h^{X100})$ of the signature SIG in the revocation list LR.

Indeed, if the entity 100 was at the origin of a signature accompanying a suspicious operation in a previous authentication of the entity 100, then the revocation list LR would comprise a pair $(h_i, k_i)$ with $k_i=h_i^{X100}$.

In this case, $C_i=h_i^A$ (for example $C_i=h_i$ if A=1).

The non-revocation verification device 20 or the second entity 200 is therefore able to detect very easily, on the basis of only the received group elements $C_i$, provided that the zero-knowledge proof P is valid, that the entity 100 should be rejected for this new authentication. It is sufficient for it to compare the received value $C_i$ with $h_i^A$. In the embodiment described here, the size of the element $C_i$ is 380 bits at most.

On the contrary, if the secret X100 has not been used in any of the signatures whose pairs are stored in the revocation list, then the element $C_i$ appears to be a pseudo-random value.

This feature is of great interest since the group element $C_i$ does not disclose any information about the secret X100.

In one particular embodiment, the signature SIG furthermore comprises the character string STR.

Figure 3:
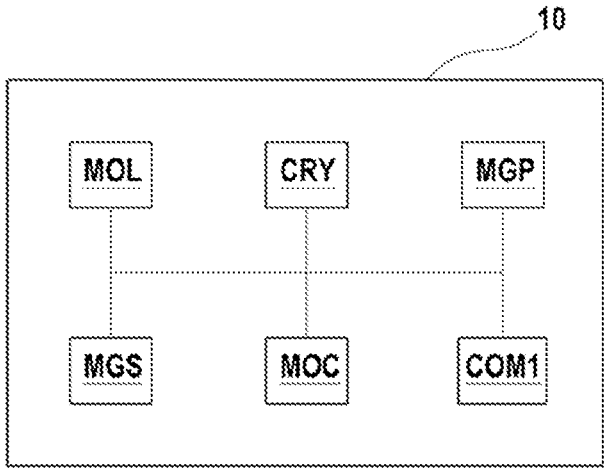
FIG. 3 shows the functional architecture of an authentication device according to one particular mode of implementation of the invention.

The computer program PGA defines functional modules of the authentication device 10 shown in FIG. 3. More precisely, the authentication device 10 designed to authenticate a first entity 100 with a second entity 200 comprises, in this embodiment:

a module MOL for obtaining a revocation list LR as described above;

a module MGS for generating a signature SIG in order to authenticate the first entity 100 with the second entity 200, this signature SIG comprising a pair $(h, h^{X100})$, where X100 is a secret of the first entity 100 and h is an element of the mathematical group G1;

a module MOC for obtaining a character string STR specific to said authentication;

a cryptographic module CRY configured to obtain, for each index i of a pair $(h_i, k_i)$ in the revocation list LR, the deterministic value $a_i$ and the group element $C_i$ described above;

a module MGP for generating a zero-knowledge proof that said device 10 used a secret X100 of the first entity to obtain the group elements $C_i$; and a module COM1 for sending, to the second entity 200:

said signature SIG;

the character string STR;

the zero-knowledge proof P; and the element $C_i$ for each pair in the revocation list LR.

Figure 4:
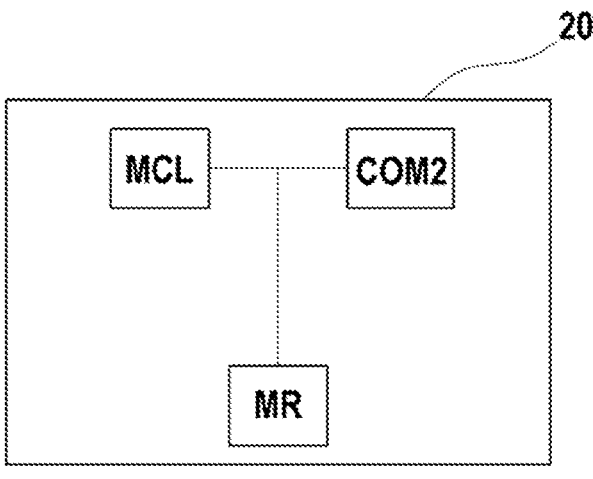
FIG. 4 shows the functional architecture of a non-revocation verification device according to one particular mode of implementation of the invention.

The computer program PGV defines functional modules of the non-revocation verification device 20 shown in FIG. 4. More precisely, the non-revocation verification device 20 configured to verify, during the authentication of a first entity 100 with a second entity 200, whether this first entity should be rejected on the grounds of revocation, comprises, in this embodiment of the invention:

a module COM2 for receiving:

a signature SIG generated by the first entity 100 for this authentication;

a character string STR;

an element $C_i$ of the group G1 for each pair $(h_i, k_i)$ in the revocation list LR;

and a zero-knowledge proof P that said first entity 100 used a secret of this first entity to obtain the group element $C_i$ for each of the pairs in the revocation list LR; and a module MR for revoking the first entity 100 if said zero-knowledge proof P is not valid or if, for at least one said pair $(h_i, k_i)$, the group element $C_i$ is such that $C_i=h_i^A$, where A is a known value.

In one particular embodiment, the non-revocation verification device 20 furthermore comprises a module MCL for creating and updating a revocation list LR as described above.

The invention claimed is:

1. An authentication method implemented by an authentication device of a first entity in order to authenticate said first entity with a second entity, said method comprising:

generating a signature in order to authenticate the first entity with the second entity, said signature comprising a pair $(h, h^{X100})$, where X100 is a secret specific to said first entity and h is an element of a mathematical group;

for each index i of a pair $(h_i, k_i)$ contained in a revocation list, said pair $(h_i, k_i)$ having been extracted from a signature generated by a revoked entity, $h_i$ being an element of said group, with $k_i=h_i^{xi}$, xi being a secret specific to said revoked entity:

(i) obtaining, deterministically, a value $a_i$ from said index i and from a character string specific to said authentication;

(ii) obtaining an element $C_i$ of said mathematical group using the formula $C_i=(h_i^{ai}\cdot k_i)^{A/ai+X100}$ where:

$h_i$ and $k_i$ are the elements of the pair of index i in the revocation list;

A is a known value;

$a_i$ is said deterministically obtained value; and

X100 is the secret of the first entity;

generating a zero-knowledge proof that said device used the secret X100 and said character string to obtain said group element $C_i$ for each of the pairs in said revocation list; and sending, to the second entity:

said signature;

said character string;

said zero-knowledge proof; and said element $C_i$ for each pair in the revocation list.

2. The authentication method as claimed in claim 1, wherein said mathematical group is a cyclic group of order p, p being a prime number.

3. The authentication method as claimed in claim 1, wherein said character string is at least part of said signature.

4. The authentication method as claimed in claim 1, wherein said value $a_i$ is obtained by $a_i=H(STR\|i)$, where H is a public hash function.

5. A non-transitory computer readable medium comprising a computer program stored thereon comprising instructions for executing the authentication method as claimed claim 1 when said program is executed by a processor of the authentication device.

6. A non-revocation verification method implemented by a non-revocation verification device of a second entity during authentication of a first entity, said method comprising:

receiving:

a signature generated by said first entity for this authentication;

a character string;

an element of one and a same mathematical group for each pair $(h_i, k_i)$ contained in a revocation list, said pair $(h_i, k_i)$ having been extracted from a signature generated by a revoked entity, $h_i$ being an element of said group, with $k_i = h_i^{xi}$, xi being a secret specific to said revoked entity; and a zero-knowledge proof that said first entity used a secret of this first entity and said character string to obtain said group element for each of the pairs contained in the revocation list; and rejecting said first entity on grounds of revocation if said zero-knowledge proof is not valid or if, for at least one said pair $(h_i, k_i)$, the group element $(C_i)$ is such that $C_i = h_i^A$, where A is a known value.

7. A non-transitory computer readable medium comprising a computer program stored thereon comprising instructions for executing the non-revocation verification method as claimed in claim 6 when said program is executed by a processor of the non-revocation verification device.

8. An authentication device of a first entity, said device being configured to authenticate said first entity with a second entity, said device comprising:

at least one processor; and at least one non-transitory computer readable medium comprising instructions stored thereon which when executed by the at least one processor configure the authentication device to:

generate a signature in order to authenticate the first entity with the second entity, said signature comprising a pair $(h, h^{X100})$, where X100 is a secret specific to said first entity and h is an element of a mathematical group;

for each index i of a pair $(h_i, k_i)$ contained in a revocation list, said pair $(h_i, k_i)$ having been extracted from a signature generated by a revoked entity, $h_i$ being an element of said group, with $k_i = h_i^{xi}$, xi being a secret specific to said revoked entity:

(i) deterministically obtain a value $a_i$ from said index i and from a character string specific to said authentication;

(ii) obtain an element $C_i$ of said mathematical group using the formula $C_i = (h_i^{ai} \cdot k_i)^{A/ai+X100}$ where:

$h_i$ and $k_i$ are the elements of the pair of index i in the revocation list;

A is a known value;

$a_i$ is said deterministically obtained value; and

X100 is the secret of the entity 100;

generate a zero-knowledge proof that said authentication device used the secret X100 and said character string to obtain said group element $(C_i)$ for each of the pairs in said revocation list; and send, to the second entity:

said signature;

said character string;

said zero-knowledge proof; and said element $C_i$ for each pair in the revocation list.

9. A non-revocation verification device, said device being configured to verify, during the authentication of a first entity with a second entity, whether this first entity should be rejected, said device comprising:

at least one processor; and at least one non-transitory computer readable medium comprising instructions stored thereon which when executed by the at least one processor configure the authentication device to:

receive:

a signature generated by said first entity for this authentication;

a character string;

an element $(C_i)$ of one and a same mathematical group for each pair $(h_i, k_i)$ in a revocation list, said pair $(h_i, k_i)$ having been extracted from a signature generated by a revoked entity, $h_i$ being an element of said group, with $k_i = h_i^{xi}$, xi being a secret specific to said revoked entity;

and a zero-knowledge proof that said first entity used a secret of this first entity and said character string to obtain said group element $(C_i)$ for each of the pairs in said revocation list; and reject said first entity on grounds of revocation if said zero-knowledge proof is not valid or if, for at least one said pair $(h_i, k_i)$, the group element $(C_i)$ is such that $C_i = h_i^A$, where A is a known value.

\*   \*   \*   \*   \*